UNITED STATES PATENT OFFICE.

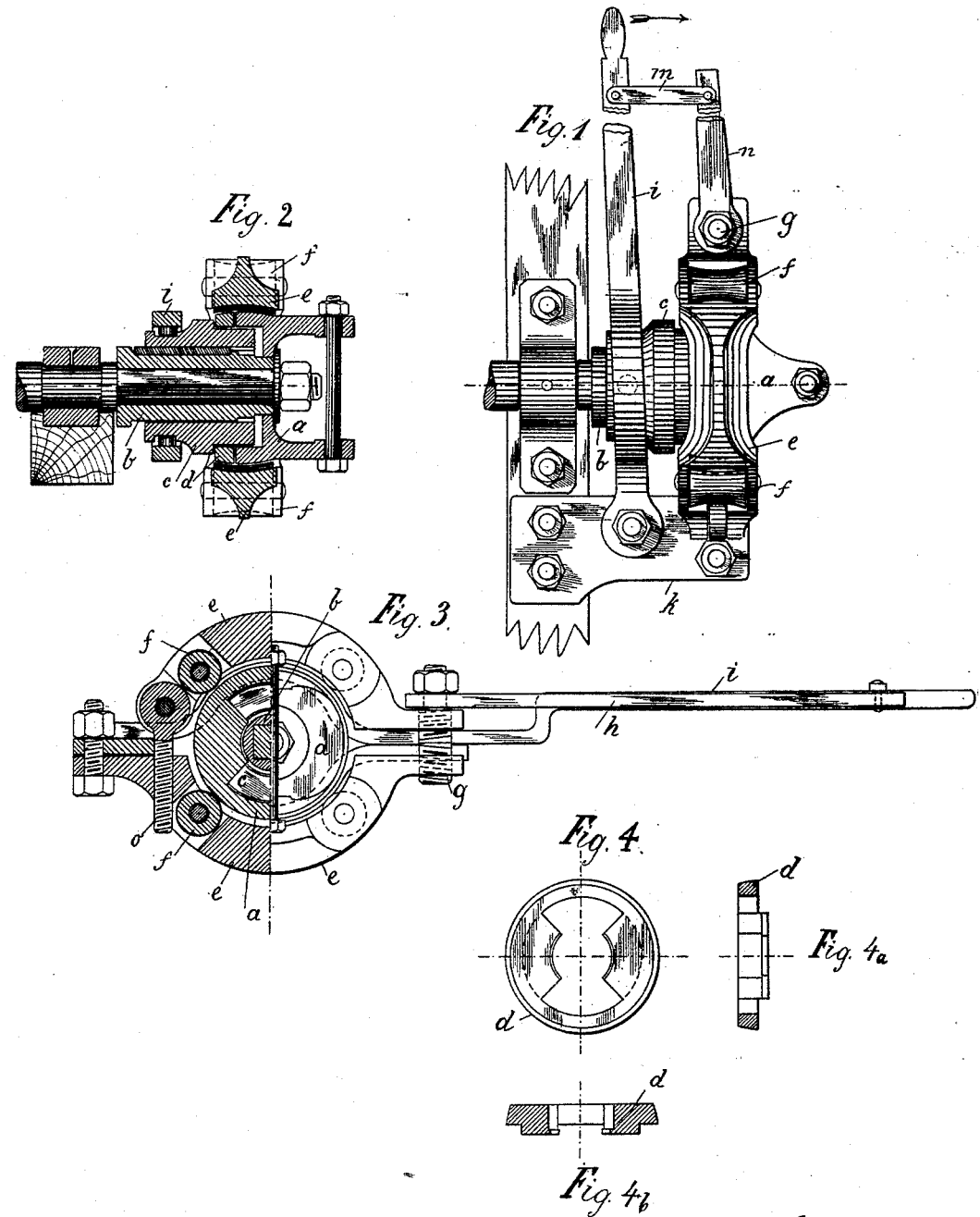

ALBERT FÜKENWIRTH, OF PETERWITZ, GERMANY.

COMBINED SAFETY-BRAKE AND SHAFT-COUPLING.

SPECIFICATION forming part of Letters Patent No. 489,123, dated January 3, 1893.

Application filed December 14, 1891. Serial No. 415,077. (No model.)

*To all whom it may concern:*

Be it known that I, ALBERT FÜKENWIRTH, manufacturer, a subject of the German Emperor, and a resident of Peterwitz, in the Province of Silesia and German Empire, have invented a certain new and useful Improved Combined Safety-Brake and Shaft-Coupling, of which the following is a full, clear, and exact specification.

The subject of the present invention is a combined safety brake and shaft coupling specially adapted for horticultural machines, gin shafts, and the like, but can be employed to like advantage for the transmission of rotary movement for instance for carriage axles, &c. In order to attain my object I employ a device consisting chiefly of a friction disk or sleeve on the periphery of which a brake with friction rollers acts and can be put on or released by a worm spindle with left and right hand threads working in the threads in the ends of a bow or strap. As soon as the worm spindle is turned in the one or the other direction the brake strap will be put onto the friction disk or released from the same. A further part of my invention relates to a shaft coupling combined with the brake, the former being a socalled clutch coupling characterized by a clutch member loosely inserted between the gearing parts and by means of which the braking is upheld even when the driving shaft is uncoupled from the driven shaft.

Figure 1 is a plan of my improved device. Fig. 2 is a central vertical section. Fig. 3 is a side elevation partly in section, and Figs. 4 $4^a$ and $4^b$ are details of the intermediate clutch member.

$a$ is a friction clutch member which receives its movement from the motor or other source of power by means of a suitable connecting piece such as the bifurcated extension $s$ for connecting the parts to a gin shaft or the like. The clutch member $a$ has recesses on the side nearest to the shaft to be driven, the journal $b$ of which as represented is loosely and axially arranged in the clutch member $a$, said recesses forming the female part of an ordinary clutch coupling.

The second part of the coupling consists of the sliding clutch member $c$ which is attached by groove and key to the trunnion or part $b$ and forms the male part of the coupling. The disk $d$ is loosely mounted on the trunnion $b$ and has an orifice (Fig. 4) corresponding to the recesses of the clutch member $a$ and the projecting part of the clutch member $e$. The clutch member $c$ is moved along the trunnion $b$ by means of the lever $i$ which is pivoted in the bracket $k$. The brake is also mounted on the bracket $k$, and consists of the two straps $e\ e$ each consisting of two parts in which the four brake rolls $f\ f$ are mounted. These two straps are attached by means of the bolt $o$ to the bracket $k$ while on the opposite side their ends form lugs having female right and left hand screw threads into which a screw spindle $g$ with square head fits. The lever $h$ is fitted to the square head of the screw spindle $g$, and may be suspended on the lever $i$ by means of the holder $m$, the lower part of which is formed as a hook on which a weight may be arranged.

The device operates in the following manner: On releasing the lever $h$ from the hooked holder of the lever $i$ the same will fall under influence of the weight attached thereto, thus turning the spindle $g$ and screwing the straps $e\ e$ nearer together, thereby pressing the brake rolls $f\ f$ onto the clutch member $a$ and the loose disk; or the lever $h$ may be pressed down by hand and the weight omitted. As soon as the machine is braked by the pressure of the brake rolls $f\ f$ on the clutch member $a$ and disk $d$, (after the gearing parts at $c$ during the releasing of the coupling by means of the lever $i$, have moved back into the latter i. e. the disk $d$) the braking can be independently transmitted to the driven parts when the positive acting clutch gearing of the coupling members $a$ and $c$ have ceased to act.

The device operates in the following manner: In order to effect a coupling of the parts, the lever $h$ is moved laterally, whereby the coupling members are brought into gear, and on the other hand the lever $i$ will, in consequence of its connection with the lever $h$, be so moved, in the like direction that the screw spindle with its right and left hand threads will apply the brake straps to the driving shaft.

Having now particularly described and ascertained the nature of my said invention, what I claim and desire to secure by Letters Patent is:

The combination of the clutch member *a* suitably connected to the machine shaft or axle and having a recessed rear portion, the clutch member *c* fitting into said recessed portion of member *a*, the journal *b* keyed to the member *c*, loosely mounted on journal *b*, the brake straps *e, e* having rollers *f, f* mounted therein and bearing on member *a* and disk *d*, the screw spindle *g* for operating said straps, and having right and left hand threads, and operating levers *h* and *i*, substantially as described.

In witness whereof I have hereunto signed my name in the presence of two subscribing witnesses.

ALBERT FÜKENWIRTH.

Witnesses:
  THEODOR SHUMMEL,
  FERDINAND BRANDES KAUFMANN.